(12) United States Patent
Gibbons et al.

(10) Patent No.: US 6,380,432 B2
(45) Date of Patent: Apr. 30, 2002

(54) MATERIALS FOR INDUCING ALIGNMENT IN LIQUID CRYSTALS AND LIQUID CRYSTAL DISPLAYS

(75) Inventors: Wayne M. Gibbons, Bear; Patricia A. Rose, Wilmington, both of DE (US); Paul J. Shannon, Exton, PA (US); Hanxing Zheng, Wilmington, DE (US)

(73) Assignee: Elsicon Inc., Newark, DE (US)

( * ) Notice: Subject to any disclaimer, the term of this patent is extended or adjusted under 35 U.S.C. 154(b) by 0 days.

(21) Appl. No.: 09/741,357

(22) Filed: Dec. 20, 2000

Related U.S. Application Data

(62) Division of application No. 09/425,589, filed on Oct. 22, 1999, now Pat. No. 6,194,039.

(51) Int. Cl.$^7$ ..................... C07C 211/36; C07C 211/51; C07C 25/13; C07C 22/08
(52) U.S. Cl. ..................... 564/309; 564/391; 564/431; 570/128; 570/129; 570/131
(58) Field of Search ............... 564/309, 431, 564/433, 391; 570/128, 129, 131; 428/1.1; 252/299.4

(56) References Cited

U.S. PATENT DOCUMENTS

| | | |
|---|---|---|
| 4,974,941 A | 12/1990 | Gibbons et al. |
| 5,032,009 A | 7/1991 | Gibbons et al. |
| 5,186,985 A | 2/1993 | Estes et al. |
| 5,270,438 A | 12/1993 | Yusa et al. |
| 5,731,405 A | 3/1998 | Gibbons et al. |
| 5,925,423 A | 7/1999 | Han et al. |
| 6,194,039 B1 * | 2/2001 | Gibbons et al. ............. 428/1.1 |
| 6,242,061 B1 * | 6/2001 | Gibbons et al. ........... 428/1.27 |

FOREIGN PATENT DOCUMENTS

| | | |
|---|---|---|
| WO | 9915576 | 4/1999 |

* cited by examiner

Primary Examiner—Shean C. Wu
(74) Attorney, Agent, or Firm—Paul J. Shannon

(57) ABSTRACT

The present invention provides novel aromatic diamines useful in preparing polyimides for optical alignment layers in liquid crystal displays. The novel compositions comprise side-chains general formula I $$-L_1-D-L_2-C_f$$

wherein D comprises 1 to 4 carbon-carbon double bonds, $C_f$ is a monovalent $C_4$ to $C_{20}$ fluorocarbon radical and $L_1$ and $L_2$ are linking groups.

4 Claims, 3 Drawing Sheets

MATERIALS FOR INDUCING ALIGNMENT IN LIQUID CRYSTALS AND LIQUID CRYSTAL DISPLAYS

CROSS-REFERENCE TO RELATED APPLICATION

This application is a division of pending application Ser. No. 09/425,589, filed Oct. 22, 1999.

This invention was made with United States Government support under Agreement No. MDA972-93-2-0014 awarded by ARPA. The United States Government has certain rights in the invention.

BACKGROUND OF INVENTION

The present invention relates to materials for aligning liquid crystals, and liquid crystal optical elements.

Current liquid crystal display (LCD) elements include a product that utilize a twisted nematic mode, i.e., having a structure wherein the aligning direction of nematic liquid crystal molecules is twisted by 90° between a pair of upper and lower electrode substrates, a product utilizing a supertwisted nematic mode, utilizing a birefringent effect, i.e. having a structure wherein the aligning direction of nematic liquid crystal molecules is twisted by 180° to 300°, an in-plane-switching mode wherein both electrodes controlling the liquid crystal alignment are present on one substrate and the direction of the liquid crystal orientation in the plane of the substrate changes upon application of an electric field, and a product utilizing a ferroelectric liquid crystal substance or an antiferroelectric liquid crystal substance. Common to each of these products is a liquid crystal layer disposed between a pair of substrates coated with a polymeric alignment layer. The polymeric alignment layer controls the direction of alignment of the liquid crystal medium in the absence of an electric field. Usually the direction of alignment of the liquid crystal medium is established in a mechanical buffing process wherein the polymer layer is buffed with a cloth or other fiberous material. The liquid crystal medium contacting the buffed surface typically aligns parallel to the mechanical buffing direction. Alternatively, an alignment layer comprising anisotropically absorbing molecules can be exposed to polarized light to align a liquid crystal medium as disclosed in U.S. Pat. Nos. 5,032,009 and 4,974,941 "Process of Aligning and Realigning Liquid Crystal Media".

The process for aligning liquid crystal media with polarized light can be a noncontact method of alignment that has the potential to reduce dust and static charge buildup on alignment layers. Other advantages of the optical alignment process include high resolution control of alignment direction and high quality of alignment.

Requirements of optical alignment layers for liquid crystal displays include low energy threshold for alignment, transparency to visible light (no color), good dielectric properties and voltage holding ratios, long-term thermal and optical stability, and in many applications a controlled uniform pre-tilt angle.

Most liquid crystal devices, including displays, have a finite pre-tilt angle, controlled, for instance, by the mechanical buffing of selected polymeric alignment layers. The liquid crystal molecules in contact with such a layer aligns parallel to the buffing direction, but is not exactly parallel to the substrate. The liquid crystal molecules are slightly tilted from the substrate, for instance by about 2–15 degrees. For optimum performance in most display applications a finite and uniform pre-tilt angle of the liquid crystal is desirable.

Polymers used in forming optical alignment layers also must have a reasonably broad processing window. Polymers used as alignment layers in commercial liquid crystal displays are generally polyimide-based systems because of their good thermal and electrical properties. Thus, within the polyimide family, polymers also must have functionality that is stable to thermal and/or chemical imidization. In addition, polymers must have good wetting characteristics and printability onto substrates to give uniform layers.

Several approaches have been explored to meet the performance requirements of optical alignment layers for production of liquid crystal displays. In particular, U.S. Pat. No. 5,731,405 describes polyimide optical alignment layers having $C_4$ to $C_{20}$ fluorinated or partially fluorinated alkyl chains as side-groups. These materials probably alter the surface properties of the optical alignment layers. International application WO 99/15576 describes photoreactive polyimide polymers that have 3-arylacrylic ester (cinnamates) side-groups. When irradiated with polarized light, these materials undergo photo-crosslinking to produce optical alignment layers with a defined angle of tilt. In this case, establishing pre-tilt in the optical alignment layer requires the use of a specific chromophore, for instance, a cinnamate ester.

In further developing pre-tilt inducing materials and processes for optical alignment layers a new class of reactive materials have been discovered that allow control of pre-tilt in optical alignment layers with chromophores other than cinnamate esters and the like.

SUMMARY OF INVENTION

The present invention provides reactive side-chain polymers within the class of polyimides, polyamic acids and esters thereof, characterized in that they comprise monovalent side chains of the general formula I:

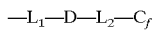

wherein the monovalent link is to a polymer main chain and wherein:

—$L_1$ and $L_2$ each, independently, is a covalent bond or a linking group selected from the group of —O—, —S—, —$NR_1$—, —O—CO—, —CO—O—, —$NR_1$—CO—, —CO—$NR_1$—, —$NR_1$—CO—O—, —O—CO—$NR_1$—, —$NR_1$—CO—$NR_1$—, and straight-chain or branched-chain alkylenes represented by —$(CH_2)_n$—, —$L_3$—$(CH_2)_n$—, —$(CH_2)_n$—$L_3$—, —$L_3$—$(CH_2)_n$—$L_4$—, each optional mono- or poly-substituted by fluorine or chlorine and optionally chain interrupted by —O— or —$NR_1$—, wherein $L_3$ and $L_4$ are selected from the group of —O—, —S—, —$NR_1$—, —O—CO—, —CO—O—, —$NR_1$—CO—, —CO—$NR_1$—, —$NR_1$—CO—O—, —O—CO—$NR_1$—, —$NR_1$—CO—$NR_1$—, $R_1$ is a hydrogen or lower alkyl group and n is 1 to 20;

D is a divalent group containing 1 to 4 carbon-carbon double bonds, selected from the group of $C_3$–$C_{24}$ aliphatic, $C_3$–$C_{24}$ alicyclic, $C_8$–$C_{24}$ arylalkyl groups, all optionally substituted with 1 to 4 heteroatoms selected from the group of oxygen, nitrogen or sulfur and optionally mono- or poly-substituted by fluorine, chlorine or cyano, wherein the carbon-carbon double bond(s) are isolated from any other Π-system within the side-chain;

$C_f$ represents a monovalent $C_4$ to $C_{20}$ fluorocarbon radical.

The invention further embodies optical alignment layers prepared from the side-chain polymers and liquid crystal display elements incorporating the optical alignment layers.

DETAILED DESCRIPTION

Figure 1:
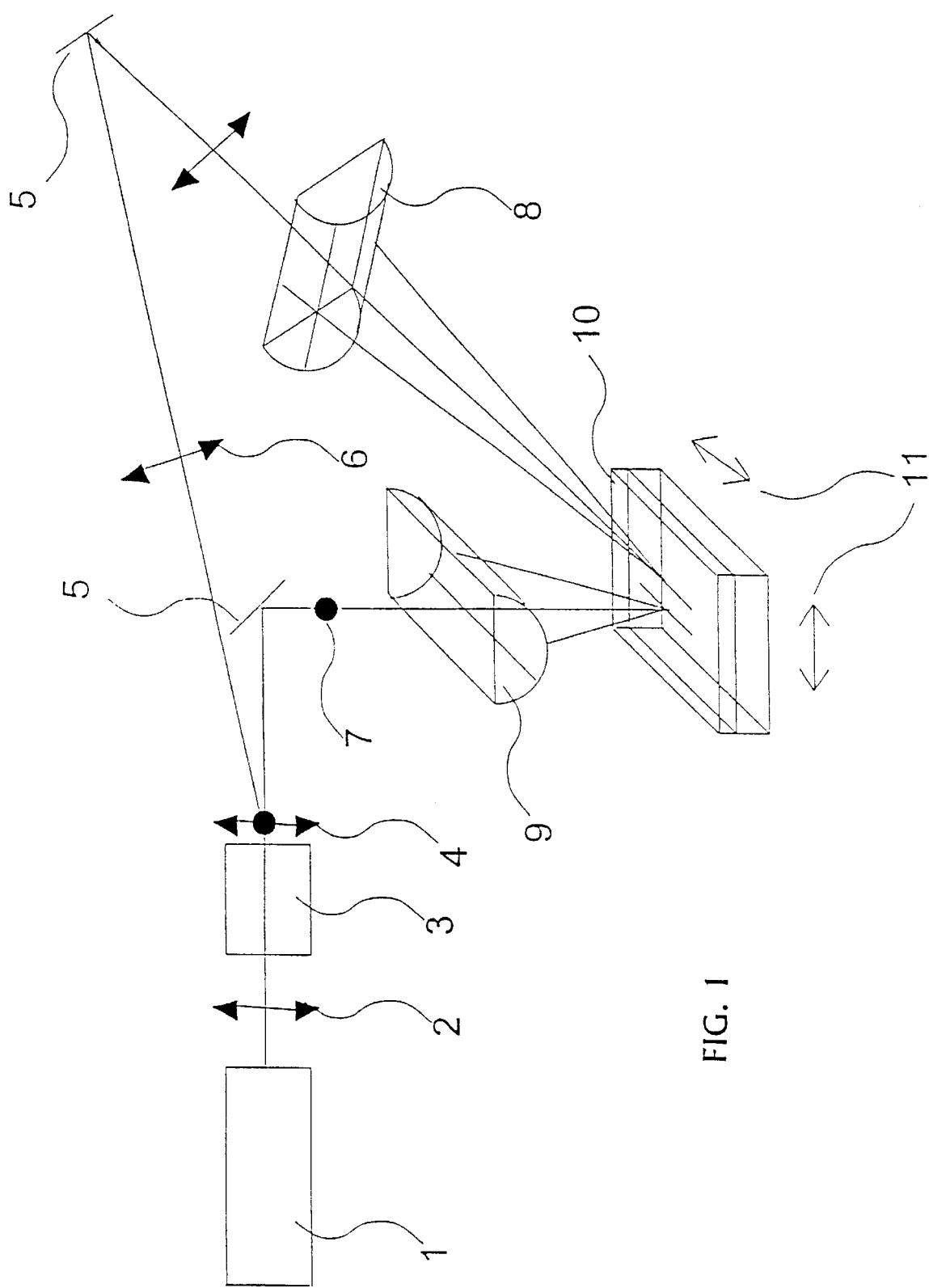
FIG. 1 illustrates the optical system used to expose the substrates to UV light.

As used herein, the term "alignment layer" is the layer of material on the surface of a substrate that controls the alignment of a liquid crystal layer in the absence of an external field. A "conventional alignment layer" herein refers to an alignment layer that will only align a liquid crystal layer via processing other than optical means. For example, mechanically buffed polyimides, evaporated silicon dioxide, LangrnuirBlodgett films, have all been shown to align liquid crystals.

"Optical alignment layer" herein refers to an alignment layer that contains anisotropically absorbing molecules that will induce alignment of liquid crystals after exposure with polarized light. The optical alignment layer can be an isotropic medium or have some degree of anisotropy before optical alignment. Optical alignment layers may be processed by conventional means, such as mechanical rubbing, prior to or after exposure to polarized light. The anisotropically absorbing molecules of the optical alignment layers exhibit absorption properties with different values when measured along axes in different directions. The anisotropic absorbing molecules exhibit absorption bands between 150 nm and about 2000 nm. Most preferable optical alignment layers for the present invention have absorbance maxima of about from 150 to 400 nm and especially about from 300 to 400 nm.

Polymers especially useful and preferred as optical alignment layers are polyimides. Polyimides are known for their excellent thermal and electrical stability properties and these properties are useful in optical alignment layers for liquid crystal displays. The preparation of polyimides is described in "Polyimides", D. Wilson, H. D. Stenzenberger, and P. M. Hergenrother Eds., Chapman and Hall, New York (1990). Typically polyimides are prepared by the condensation of one equivalent of a diamine with one equivalent of a dianhydride in a polar solvent to give a poly(amic acid) prepolymer intermediate. Copolymer polyimides are prepared by the condensation of one or more diamines with one or more dianhydrides to give a copolyamic acid.

An alternative intermediate to polyimides are poly(amic esters) that can be made by esterification of poly(amic acids) with alcohols. The poly(amic esters) undergo thermal imidization to form polyimides.

Thus, poly(amic acids) and poly(amic esters) are considered to be closely related percursors to polyimides of the invention. Therefore, they are considered further embodiments of this invention. Furthermore, preimidized polyimides derived from chemical or thermal imidzation of poly(amide acids) or poly(amide esters) are also considered an embodiment of the invention.

The novel polymers of the invention are reactive side-chain polymers within the class of polyimides, polyamic acids and esters thereof, characterized in that they comprise monovalent side chains of the general formula I:

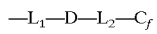

wherein the monovalent link is to a polymer main chain and wherein:

$L_1$ and $L_2$ each, independently, is a covalent bond or a linking group selected from the group of —O—, —S—, —NR$_1$—, —O—CO—, —CO—O—, —NR$_1$—CO—, —CO—NR$_1$—, —NR$_1$—CO—O—, —O—CO—NR$_1$—, —NR$_1$—CO—NR$_1$—, and straight-chain or branched-chain alkylenes represented by —(CH$_2$)$_n$—, —L$_3$—(CH$_2$)$_n$—,—(CH$_2$)$_n$—L$_3$, —L$_3$—(CH$_2$)$_n$—L$_4$—, each optionally mono- or poly-substituted by fluorine or chlorine and optionally chain interrupted by —O— or —NR$_1$, wherein L$_3$ and L$_4$ are selected from the group of —O—, —S—, —NR$_1$—, —O—CO—, —CO—O—, —NR$_1$—CO—, —CO—NR$_1$—, —NR$_1$—CO—O—, —O—CO—NR$_1$—, —NR$_1$—CO—NR$_1$—, R$_1$ is a hydrogen or lower alkyl group and n is 1 to 20;

D is a divalent group containing 1 to 4 carbon-carbon double bonds, selected from the group of C$_3$–C$_{24}$ aliphatic, C$_3$–C$_{24}$ alicyclic, C$_8$–C$_{24}$ arylalkyl groups, all optionally substituted with 1 to 4 heteroatoms selected from the group of oxygen, nitrogen and sulfur and optionally mono- or poly-substituted by fluorine, chlorine or cyano, wherein the carbon-carbon double bond(s) are isolated from any other Π-system within the side-chain;

C$_f$ represents a monovalent C$_4$ to C$_{20}$ fluorocarbon radical.

The phrase "chain interrupted by O— or —NR$_1$" means that one or more carbons in the straight-chain or branched-chain alkylene group are formally replaced by O— or —NR$_1$.

Preferred L$_1$ and L$_2$ are a covalent bond, —O— and —NR$_1$—.

The term "lower alkyl group" denotes straight-chain and branched saturated hydrocarbon radicals having from 1 to 6, preferably from 1 to 4, carbon atoms, such as methyl, ethyl, or isopropyl and the like. "Lower alkoxy" denotes the same hydrocarbon radicals connected to an oxygen linking atom. "Lower fluoroalkyl" denotes the same hydrocarbon radicals mono- or poly-substituted with fluorine. "Lower fluoroalkoxy" denotes the same hydrocarbon radicals mono- or poly-substituted with fluorine and connected to an oxygen linking atom.

Referring to the "D" moiety, the term "C$_8$–C$_{24}$ arylalkyl group" denotes an organic radical comprising aryl and alkyl radicals or aryl and alicyclic radicals. Examples of the former are 1-phenylbutyl, 3-phenylpentyl and the like. Examples of the latter are phenylcyclohexyl, 1,2,3,4-tetrahydronaphthalene, and the like. The term "optionally substituted with 1 to 4 heteroatoms selected from the group of oxygen, nitrogen or sulfur" means that one to four carbons atoms in the aliphatic alicyclic or arylalkyl radical can be formally replaced by oxygen, nitrogen or sulfur. For instance, formal replacement of one carbon in a phenyl ring with nitrogen would denote a pyridine ring. Formal replacement of the 2 carbon in 2-phenylbutane with nitrogen would denote N-methyl-N-ethylaniline. The phrase "isolated from any other Π-system within the side-chain" means that the carbon-carbon double bond(s) are not in direct conjugation to another Π-system, for instance, an aromatic ring (e.g. stilbene), carbonyl group (e.g. acrylate) or combination of both (e.g. chalcone).

Preferably D has 1 to 2 carbon-carbon double bonds and is a C$_3$–C$_{10}$ aliphatic or arylalkyl group substituted with 0 to 1 heteroatoms. Preferred D moieties are listed in Table 1. Most preferred D moieties are 1,3-substitued-2-propenyl and 1,4-substituted-2-butenyl moieties. A wide variety of structural variation within D is possible.

The term "reactive" is not meant to restrict the side-chain polymers to a specific mode of action. Rather, the term is meant to suggest to the artisan how the polymers may perform their function. To speculate, the double bonds in the D group may provide reactivity that allows a change in the chemical environment of the side-chain during and/or after exposure to polarized light. This change may be caused by bond forming, bond breaking, isomerization or some combination. The D group also may be acting as polarizable functionality that interacts with other anisotropic dipoles in the polymer medium. In any event, the invention is not restricted to a specific mechanism of action.

Referring to the $C_f$ group, the phrase "monovalent $C_4$ to $C_{20}$ fluorocarbon radical" refers to $C_4$ to $C_{20}$ saturated and unsaturated, straight-chain and branched alkyl, alicyclic, aryl and arylalkyl hydrocarbon radicals mono-or poly-substituted by fluorine. Examples of fluoroalkyl groups are: 1H,1H-pentadecafluorooctyl, 1H,1H,10H-octadecafluorodecane, 2-(perfluorohexyl)ethyl, perfluorohexyl, perfluoroheptyl, perfluorooctyl, perfluorononyl, and perfluoroisopentyl. Examples of fluoroalicyclic groups are perfluorocyclopentyl and perfluorocyclohexyl. Examples of fluoroaryl groups are: pentafluorophenyl, and octafluoronaphthyl. An example of fluoroarylalkyl groups is perfluoro-4-methylphenyl. Preferably the $C_f$ group has 6 to 20 fluorinated carbons and most preferably has 8 to 20 fluorinated carbons. Preferred $C_f$ groups include perfluorohexyl, perfluorooctyl, 1H,1H,2H,2H-perfluorooctyl and 1H,1H,10H-perfluorodecyl. Most preferred are 1H,1H-perfluorooctyl and 1H,1H,2H,2H-perfluorooctyl.

Preferred polyimides, polyamic acids and polyamide esters of the invention are side-chain polymers wherein the polymer main chain comprises identical or different repeat groups selected from one or more of the general formula

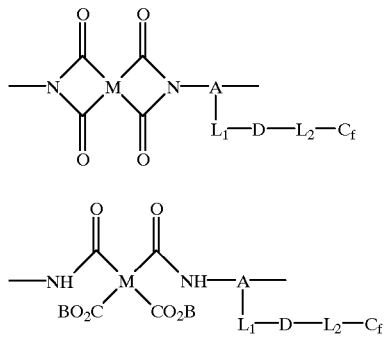

IIa

IIb wherein M is a tetravalent organic radical of a tetracarboxylic acid dianhydride after formal removal of the two —CO—O—CO— groups, the four valencies of which are distributed between four different carbon atoms of the radical; A is a trivalent unsubstituted or optionally fluoro-, chloro-, cyano-, lower alkyl-, lower alkoxy-, lower fluoroalkyl- or lower fluoroalkoxy-substituted aromatic or alicyclic group; and B is hydrogen or a monovalent organic group derived from an alcohol after formal removal of the hydroxyl group.

Preferably M is a diaryl ketone of the general formula

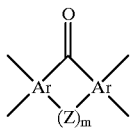

wherein Ar is an unsubstituted or optionally fluoro-, chloro-, bromo-, trifluoromethyl- and cyano-substituted aromatic system selected from the group of five, six, nine and ten carbon systems wherein none, one or two of the carbons are formally replaced by a heteroatom selected from the group —O—, —N—, and —S—; and Z and m are described below. Preferred Ar systems are selected from the group of phenyl, pyridinyl, pyrimidinyl, naphthyl, and thiophenyl.

More preferably, M is a diaryl ketone of formula

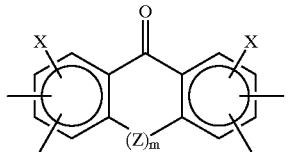

wherein X is independently selected from the group H, Cl, F, Br and $CF_3$; Z is selected from the group —S—, —O—, —$SO_2$—, —$CH_2$—, —$C(CF_3)_2$—, —C(O)—, —$CH_2CH_2$—, —$NR_1$— and a covalent bond wherein $R_1$ is selected from H or a lower alkyl group; m is 1 or 0; and A is selected from the group

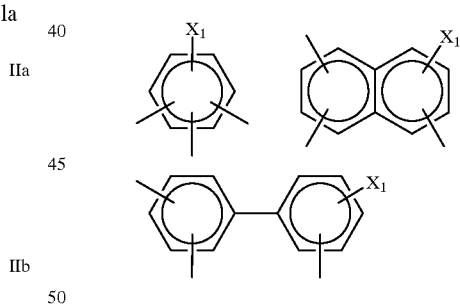

wherein $X_1$ is selected from the group H, F, Cl, —CN, lower alkyl, lower alkoxy, lower fluoroalkyl, or lower fluoroalkoxy. Preferably A is a substituted or unsubstituted trivalent phenyl group and most preferably an unsubstituted trivalent phenyl group, i.e., $X_1$ is hydrogen.

Preferred polymers of the invention are wherein m is 0 and X is H or Cl. These are derived from 3,3',4,4'-benzophenonetetracarboxylic dianhydride and 2,2'-dichloro-4,4',5,5'-benzophenone tetracarboxylic dianhydride. Both materials are colorless, provide reasonable solubility characteristics to the polyamic acids, and provide a photoactive UV chromophore. A particularly preferred side-chain polyimide comprises the repeat unit

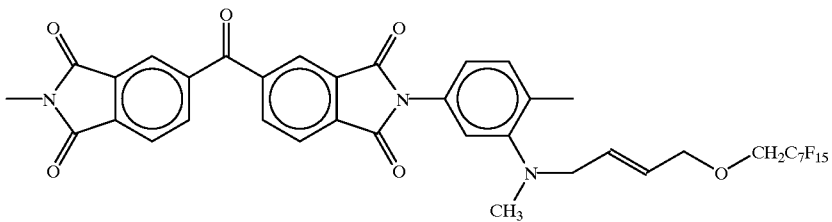

The benzophenonetetracarboxylic dianhydrides are readily available from commercial sources or synthesis. For instance, 3,3',4,4'-benzophenonetetracarboxylic dianhydride (BTDA) is available from Aldrich Chemical Co., Inc. (1001 W. St. Paul Ave., Milwaukee, Wis. 53233). 2,2'-Dichloro-4,4',5,5'-benzophenone tetracarboxylic dianhydride is available from 4-chloro-o-xylene by Friedel-Crafts acylation with oxalyl chloride to give 2,2'-dichloro-4,4',5,5',-tetramethylbenzophenone, followed by oxidation with nitric acid and dehydration of the resulting tetracarboxylic acid as described by Falcigno, et al., J. Poly. Sci. 1992, 30, 1433.

Other diaryl ketones dianhydrides that are useful in the process of the invention, wherein m is 1, are the polycyclic diaryl ketone dianhydrides described by Pfeifer, et al., in U.S. Pat. No. 4,698,295 and hereby incorporated by reference.

A wide variety of other dianhydrides, of course, may be used in forming copolyamic acids. Specific examples of other tetracarboxylic dianhydride components include aromatic dianhydrides such as pyromellitic dianhydride, 2,3,6,7-naphthalenetetracarboxylic dianhydride, 1,2,5,6-naphthalenetetracarboxylic dianhydride, 1,4,5,8-naphthalenetetracarboxylic dianhydride, 3,3'4,4'-biphenyltetracarboxylic dianhydride, 2,3,2',3'-biphenyltetracarboxylic dianhydride, bis(3,4-dicarboxyphenyl)ether dianhydride, bis(3,4-dicarboxyphenyl)diphenylsulfone dianhydride, bis(3,4-dicarboxyphenyl)methane dianhydride, 2,2-bis(3,4-dicarboxyphenyl)propane dianhydride, 1,1,1,3,3,3-hexafluoro-2,2-bis(3,4-dicarboxyphenyl)propane dianhydride, bis(3,4-dicarboxyphenyl)dimethylsilane dianhydride, 2,3,4,5-pyridinetetracarboxylic dianhydride; alicyclic tetracarboxylic dianhydrides such as 1,2,3,4-butanetetracarboxylic dianhydride, 1,2,3,4-cyclobutanetetracarboxylic dianhydride, 1,2,3,4-cyclopentanetetracarboxylic dianhydride, 1,2,4,5-cyclohexanetetracarboxylic dianhydride, 2,3,5-tricarboxycyclopentylacetic acid dianhydride and 3,4-dicarboxy-1,2,3,4-tetrahydro-1-naphthalenesuccinic dianhydride; and their acid and acid chloride derivatives.

The most preferred polyimides of the invention require novel aromatic diamines of the structure

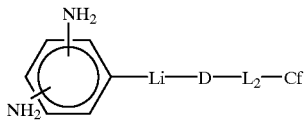

wherein $L_1$, $L_2$, D, and $C_f$ have the same meaning as described earlier. Preferred aromatic diamines are 4-substituted-1,3-benzenediamines and 2-substituted-1,4-benzenediamines wherein the substituent is —$L_1$—D—$L_2$—$C_f$ side-chain. Most preferred diamines are 2-substituted 1,4-benzene diamines.

Figure 3:
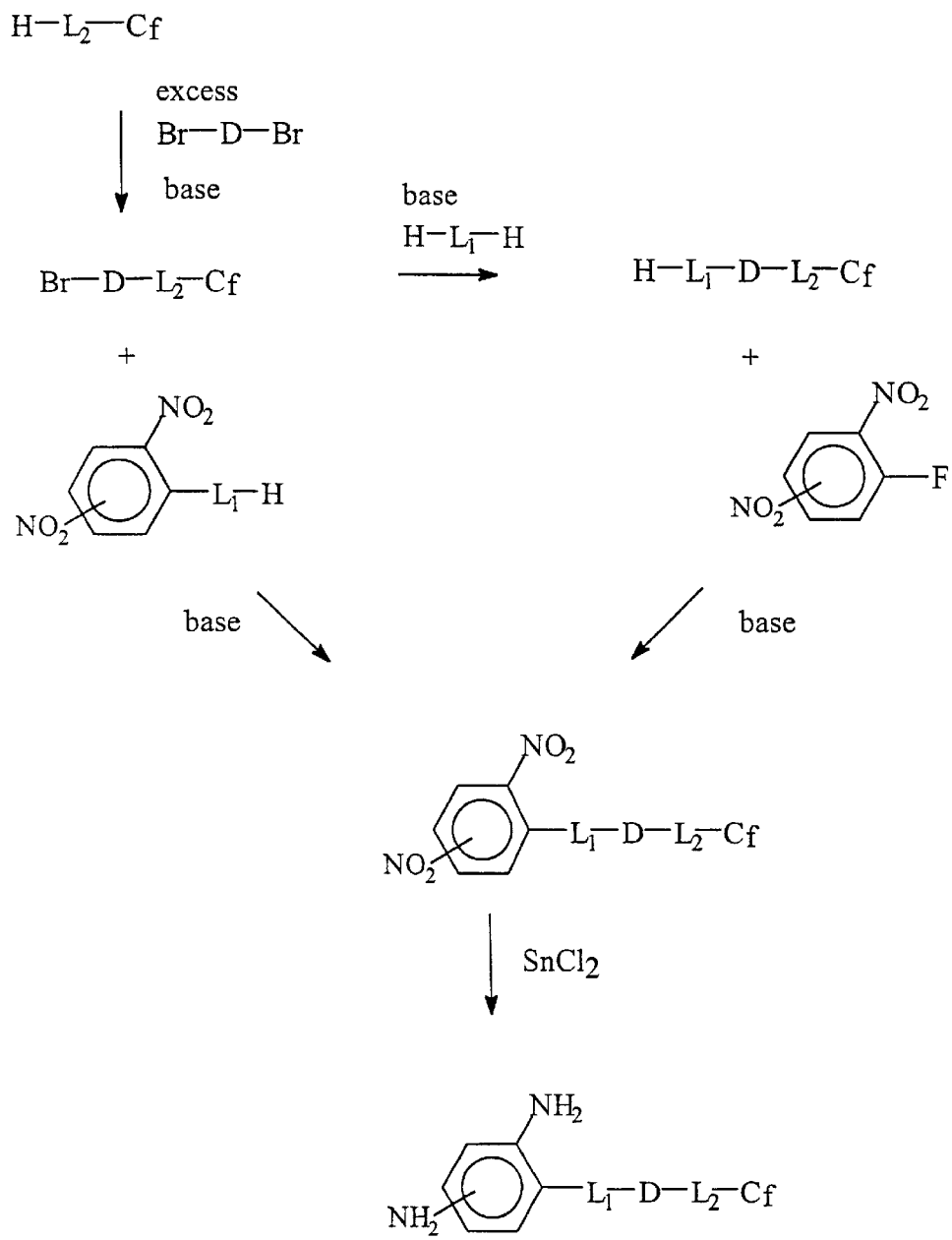
FIG. 3 illustrates the synthesis of novel side-chain aromatic amines.

Generally the novel aromatic diamines can be readily prepared by the synthesis outlined in FIG. 3. Starting materials, H—$L_2$—$C_f$, are fluorinated or partially fluorinated alcohols, amines, or thiols, which are treated to react selectively at one site with an excess of a dibromide Br—D—Br in the presence of base. The excess dibromide is removed to give the monobromide intermediate Br—D—$L_2$—$C_f$. The monobromide can be treated with, for instance, a dinitrophenol ($L_1$—H=OH) and base to give a dinitro aromatic compound which upon treatment with tin(II) chloride gives the required aromatic diamine. Alternatively, the monobromide intermediate Br—D—$L_2$—$C_f$ can be treated with H—$L_1$—H, e.g. water, a primary aliphatic amine, or hydrogen sulfide to produce the intermediate H—$L_1$—D—$L_2$—$C_f$. Further treatment of H—$L_1$—D—$L_2$—$C_f$ with, for instance, dinitrofluorobenzene and base, gives a dinitro aromatic compound.

Alternatively, dinitrophenols can be alkylated with an excess of the dibromide Br—D—Br. The resulting monobromides can be treated with fluorinated or partially fluorinated alcohols, amines or thiols to produce dinitro aromatic compounds. The dibromide, Br—D—Br, may be replaced by other dihalides, for instance, the dichloride, Cl—D—Cl. Other dinitrohalobenzenes, for instance dinitrochlorobenzene, maybe used instead of dinitrofluorobenzene. Furthermore, nitrohalobenzenamines can be used in place of dinitrohalobenzenes as exemplified in the Examples.

Monofunctional fluorinated and partially fluorinated alcohols are commecially available. For instance, 1H, 1H,5H-octafluoro-1-pentanol, 1H, 1H-perfluoro-1-octanol, 1H,1H,2H,2H-perfluorooctanol, 1H, 1H-perfluoro-1-decanol, 1H, 1H,2H,2H-perfluoro-1-decanol, 1H,1H,2H,2H-perfluoro-1-dodecanol are commecially available from Oakwood Products, Inc., West Columbia, S.C. 29169. Several others are available by reduction of the corresponding acids or acid chlorides using the procedure of Bilibin, et al., in Macromol. Chem. Phys., 197, 1021–1029 (1966).

Fluorinated and partially fluorinated primary and secondary amines are readily available by reduction of the corresponding amides with diborane in tetrahydrofuran.

Table 2 lists examples of preferred diamines. Examples 1–9 describe the synthesis and exemplify generally the synthesis of the novel diamines.

A variety of other diamines may be useful in the preparation of novel copolyimides of the invention including aromatic diamines such as are 2,5-diaminobenzonitrile, 2-(trifluoromethyl)-1,4-benzenediamine, p-phenylenediamine, 2-chloro- 1,4-benzenediamine, 2-fluoro- 1,4-benzenediamine, m-phenylenediamine, 2,5-diaminotoluene, 2,6-diaminotoluene, 4,4'-diaminobiphenyl, 3,3'-dimethyl-4,4'-diaminobiphenyl, 3,3'-dimethoxy-4,4'-diaminobiphenyl, diaminodiphenylmethane, diaminodiphenyl ether, 2,2-diaminodiphenylpropane, bis(3,5-diethyl-4-aminophenyl)methane, diaminodiphenylsulfone, diaminonaphthalene, 1,4-bis(4-aminophenoxy)benzene, 4,4'-diaminobenzophenone, 3,4'-diaminobenzophenone, 1,4-bis(4-aminophenyl)benzene, 9,10-bis(4-aminophenyl) anthracene, 1,3-bis(4-aminophenoxy)benzene, 4,4'-bis(4-aminophenoxy)diphenylsulfone, 2,2-bis[4-(4-aminophenoxy)phenyl]propane, 2,2-bis(4-aminophenyl) hexafluoropropane and 2,2-bis[4-(4-aminophenoxy)phenyl] hexafluoropropane; alicyclic diamines such as bis(4-aminocyclohexyl)methane; and aliphatic diamines such as tetramethylenediarnine and hexamethylene diamine. Further, diaminosiloxanes such as bis(3-aminopropyl) tetramethyldisiloxane may be used. Such diamines may be used alone or in combination as a mixture of two or more of them. Preferred diamines for preparing copolyimides are 2,5-diaminobenzonitrile, 2-(trifluoromethyl)-1,4-benzenediamine, 2-(N,N-diallylamino) 1,4-benzenediamine, 1-(N,N-diallylamino)-2,4-benzenediamine and 1,4-phenylene diamine. More preferred diamines are 2,5-diaminobenzonitrile, 2-(trifluoromethyl)-1,4-benzenediamine and 2-(N,N-diallylamino) 1,4-benzenediamine.

Preferably the novel polyimides and copolyimides of the invention comprise 5 to 100 mol %, and more preferably 20 to 90 mol %, of the side-chain repeat unit.

In preparing polyamic acids for optical alignment layers the molar ratio of diamine to dianhydride usually is 1:1, but can vary between 0.8:1 to 1.2:1. The preferred ratio of diamine to dianhydride is between 0.9:1 and 1.1:1.

To prepare the optical alignment layers the poly(amic acid) solutions or preimidized polyimide solutions are coated onto desired substrates. Coating is usually accomplished with 2 to 30 wt % solids. Any conventional method may be used to coat the substrates including brushing, spraying, spin-casting, meniscus coating, dipping or printing. The preferred techniques for coating substrates demonstrated in the Examples are spinning and printing. However, the optical alignment materials of the invention are not limited to use in printing or spinning processes.

The coated substrates are heated in an oven under an inert atmosphere, for instance nitrogen or argon, at elevated temperatures usually not exceeding 300° C. and preferably at or below 180° C. for about from 1 to 12 hours, preferably for about 2 hours or less. The heating process removes the solvent carrier and may be used to further cure the polymer. For instance, the poly(amic) acid films are thermally cured to generate polyimide films.

The concentration of polymer and choice of solvents can affect the optical alignment quality, pretilt and voltage holding ratio (VHR). For example, the optical alignment quality has been observed to improve under the same exposure conditions when the concentration of polymer is decreased in solution. The choice of solvent and/or co-solvents can also affect the alignment quality. A correlation between film thickness and alignment quality also is evident. In particular, the optical alignment quality improves with decreasing thickness. Similarly, VHR increases with decreasing film thickness.

The optical alignment layers are exposed to polarized light to induce alignment of liquid crystals. By "polarized light" is meant light that is elliptically and/or partially polarized such that the light is more polarized along one axis (referred to as the major axis) versus the orthogonal axis (referred to as the minor axis). In this invention the polarized light has one or more wavelengths of about from 150 to 2000 nm and preferably of about from 150 and 1600 nm and more preferably about from 150 to 800 nm. Most preferably, the polarized light has one or more wavelengths of about from 150 to 400 nm, and especially about from 300 to 400 nm. A preferred source of light is a laser, e.g., an argon, helium neon, or helium cadmium. Other preferred sources of light are mercury arc deuterium and quartz tungsten halogen lamps, xenon lamps, microwave excited lamps and black lights in combination with a polarizer. Polarizers useful in generating polarized light from nonpolarized light sources are interference polarizers made from dielectric stacks, absorptive polarizers, diffraction gratings and reflective polarizers based on Brewster reflection. With lower power lasers or when aligning small alignment regions, it may be necessary to focus the light beam onto the optical alignment layer.

By "exposing" is meant that polarized light is applied to the entire optical alignment layer or to a portion thereof. The light beam may be stationary or rotated. Exposures can be in one step, in bursts, in scanning mode or by other methods. Exposure times vary widely with the materials used, etc., and can range from less than 1 msec to over an hour. Exposure may be conducted before or after contacting the optical alignment layer with the liquid crystal medium. Exposing can be accomplished by linearly polarized light transmitted through at least one mask having a pattern or with a beam of linearly polarized light scanned in a pattern. Exposing also may be accomplished using interference of coherent optical beams forming patterns, i.e., alternating dark and bright lines.

Exposure energy requirements vary with the formulation and processing of the optical alignment layer prior and during exposure. A preferred range of exposure energy is about from 0.001 to 100 $J/cm^2$ and most preferred range of exposure energy is about from 0.001 to 5 $J/cm^2$. Lower exposure energy is most useful in large scale manufacturing of optical alignment layers and liquid crystal display elements. Lower exposure energy also minimizes the risk of damage to other materials on the substrates.

The quality of alignment and electrical properties of the liquid crystal cell assembled from exposed substrates can be improved by heating the substrates after exposure but prior to assembly and/or filling of the cell. This additional heating of the substrates and/or cells is not a requirement of the process but may give beneficial results.

Applying a liquid crystal medium to the optical alignment can be accomplished by capillary filling of a cell, by casting of a liquid crystal medium onto an optical alignment layer, by laminating a preformed liquid crystal film onto an optical alignment layer or by other methods. Preferred methods are capillary filling of a cell, injection filling and casting of a liquid crystal medium onto an optical alignment layer. Optical alignment layers are pre-exposed to polarized light or they are exposed after contacting the liquid crystal medium.

A cell can be prepared by using two coated substrates to provide a sandwiched layer of liquid crystal medium. The pair of substrates can both contain optical alignment layers or a conventional alignment layer (e.g., mechanically buffed) can be used as the second alignment layer comprising the same or a different polymer.

As liquid crystal substances used for liquid crystal optical elements, nematic liquid crystal substances, ferroelectric liquid crystal substances, etc. are usable. Useful liquid crystals for the invention described herein include positive dielectric liquid crystals including 4-cyano-4'-alkylbiphenyls, 4-cyano-4'-alkyloxybiphenyls, 4-alkyl-(4'-cyanophenyl)cyclohexanes, 4-alkyl-(4'cyanobiphenyl) cyclohexanes, 4-cyanophenyl-4'-alkylbenzoates, 4-cyanophenyl-4'alkyloxybenzoates, 4-alkyloxyphenyl-4'- cyanobenzoates, 4-alkylphenyl-4'alkylbenzoates, 1-(4'-alkylphenyl)-4-cyanopyrimidines, 1-(4'-alkyloxyphenyl)-4-cyanopyrimidines and 1-(4-cyanophenyl)-4-alkylpyrimidines. Other useful liquid crystals are new superfluorinated liquid crystals available from EM Industries, (Hawthrone, N.Y.) including the commercial materials: ZLI-5079, ZLI-5080, ZLI-5081, ZLI-5092, ZLI-4792, ZLI-1828, MLC-2016, MLC-2019, MLC-6252 and MLC-6043. Other useful nematic materials for practicing the invention include the commercial liquid crystals available from Lodic Co., Ltd, (Tokyo, Japan) including the DLC series: 22111, 22112, 22121, 22122, 23070, 23170, 23080, 23180, 42111, 42112, 42122, 43001,43002, 43003, 63001, 63002, 63003, 63004, and 63005.

Polymerizable liquid crystal monomers also are useful in the invention. Preferred are those disclosed in U.S. Pat. No. 5,846,452, hereby incorporated by reference.

The invention is not limited to the use of liquid crystals defined above. One skilled in the art will recognize that the invention will be of value with many diverse liquid crystal structures and formulations containing mixtures of liquid crystals.

The exposed optical alignment layer induces alignment of a liquid crystal medium at an angle + and −θ with respect to the direction of the linear polarization of the incident light beam and along the plane of the optical alignment layer. One skilled in the art will recognize that the process allows control of the alignment of a liquid crystal medium in any desired direction within the plane of the optical alignment layer by controlling the conditions of the polarized light exposure. Thus, θ can range from 0 to 180° to the polarization direction.

Figure 2:
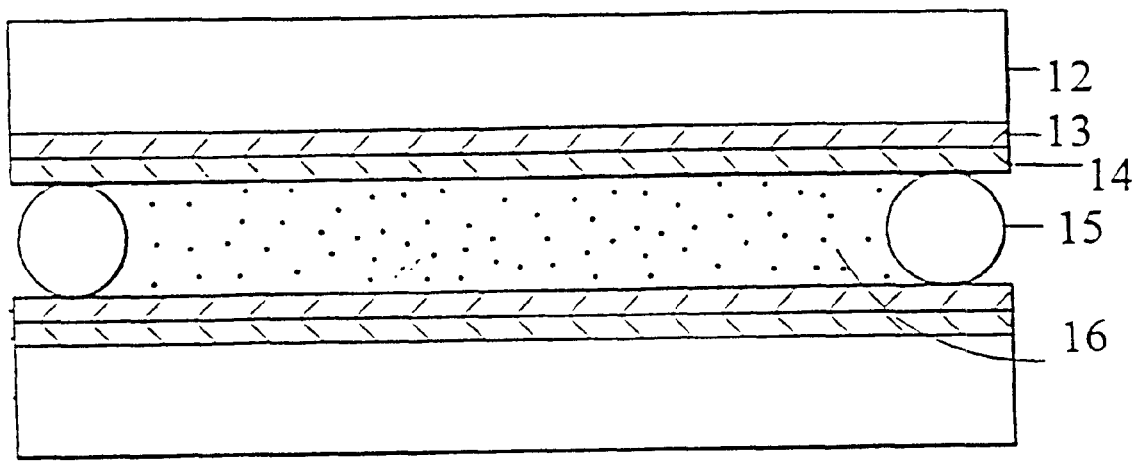
FIG. 2 is a cross-sectional view of a LCD element of the present invention.

A liquid crystal display element of the invention is composed of an electrode substrate having at least one side-chain polyimide optical alignment layer, a voltage-impressing means and a liquid crystal material. FIG. 2 illustrates a typical liquid crystal display element, comprising a transparent electrode 13 of ITO (indium-tin oxide) or tin oxide on a substrate 12 and optical alignment layers 14 formed thereon. The optical alignment layers are exposed to polarized light of a wavelength or wavelengths within the absorption band of the anisotropically absorbing molecules. A spacer concurrently with a sealing resin 15 is intervened between a pair of optical alignment layers 14. A liquid crystal 16 is applied by capillary filling of the cell and the cell is sealed to construct a liquid crystal display element. Substrate 12 may comprise an overcoat film such as an insulating film, a color filter, a color filter overcoat, a laminated polarizing film etc. These coatings and films are all considered part of the substrate 12. Further, active elements such as thin film transistors, a nonlinear resistant element, etc. may also be formed on the substrate 12. These electrodes, undercoats, overcoats, etc. are conventional constituents for liquid crystal display elements and are usable in the display elements of this invention. Using the thus formed electrode substrate, a liquid crystal display cell is prepared, and a liquid crystal substance is filled in the space of the cell, to prepare a liquid crystal display element in combination with a voltage-impressing means.

Optical alignment layers of the invention are compatible with all liquid crystal display modes. A liquid crystal display element of the invention can comprise a variety of display configurations including twisted nematic, super twisted nematic, in-plane-switching, vertical alignment, active-matrix, cholesteric, polymer dispersed, ferroelectric, anti-ferroelectric and multi-domain liquid crystal displays. Although the display modes demonstrated in this specification are primarily twisted nematic, the optical alignment layers of the invention are not limited to use in twisted nematic liquid crystal displays.

Optical alignment layers of the invention are useful in many other liquid crystal devices other than liquid crystal displays. These include electro-optical light modulators, all-optical light modulators, erasable read/write optical data storage media; diffractive optical components such as gratings, beamsplitters, lenses (e.g., Fresnel lenses), passive imaging systems, Fourier processors, optical disc and radiation collimators; binary optical devices formed by combining refractive and diffractive optics including eyeglasses, cameras, night vision goggles, robotic vision and three-dimensional image viewing devices; and holographic devices such as heads-up displays and optical scanners.

Some Examples use 1-(N,N-diallylamino)-2,4-benzenediamine as a comonomer. This material was prepared in the following manner:

A mixture of 2,4-dinitrofluorobenzene (9.3 g), N-methylpyrrolidinone (NMP, 50 mL), diallylamine (5.82 g) and potassium carbonate (6.9 g) was stirred at ambient temperature for 1 h. The mixture was poured into water and extracted with ethyl ether. The extract was washed twice with water, once with saturated brine solution, and dried over magnesium sulfate. Concentration of the extract gave N,N-diallyl-2,4-dinitrobenzenamine as a yellow oil (14.6 g).

The above yellow oil (14.6 g) was treated with a solution of tin (II) chloride dihydrate (90.0 g,), 10 N hydrochloric acid (75 mL) and ethanol (250 mL) at 55–60° C. for 14.5 h. The mixture was poured into ice water and basified with cold 20 wt % potassium hydroxide solution (750 g). The mixture was extracted with ethyl ether, the extracts washed with water three times, washed with saturated brine solution, and dried ($MgSO_4$). The mixture was concentrated, purified by chromatography followed by Kugelrohr distillation (115–120° C., 0.1 mm Hg) to give 1-(N,N-diallylamino)-2,4-benzenediamine as yellow oil. $^1H$ NMR ($CDCl_3$) 6.79 (d, 1H), 6.08 (m, 2H), 5.80 (m, 2H), 5.10 (m, 4H), 3.45 (dt, 4H), 4.0 (bs) and 3.5 (bs).

The extraction, washing and drying procedures described above are repeated several times throughout the Examples for procedures using NMP and procedures using tin(II) chloride dihydrate. They are referred to as "extraction in the normal fashion". In preparation of polyamic acids in the Examples, NMP and γ-butyrolactone were distilled from calcium hydride before use.

TABLE 1

Preferred D-groups used in Side-chain polyimides of the invention.

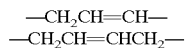
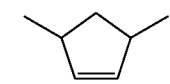
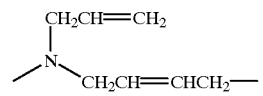

TABLE 1-continued

Preferred D-groups used in Side-chain polyimides of the invention.

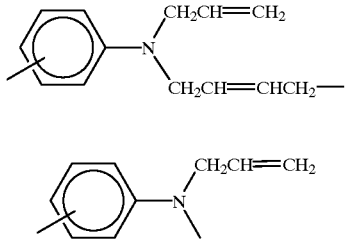

TABLE 2

Examples of aromatic diamines with reactive side-chains.

| Di-amine No. | Structure |
|---|---|
| 1 | (structure: Me-N(CH₂CH=CHCH₂OCH₂C₇F₁₅) on diaminobenzene) |
| 2 | (structure: Me-N-CH₂CH=CH-CH₂-N(CH₃)(C₆F₁₃) on diaminobenzene) |
| 3 | (structure: diaminophenyl-O-CH₂CH=CH-CH₂-O-CH₂C₇F₁₅) |
| 4 | (structure: Me-N(CH₂CH=CH-C₈F₁₇) on diaminobenzene) |
| 5 | (structure: diaminophenyl-N(CH₂CH=CH₂)(C₆H₄-C₈F₁₇)) |
| 6 | (structure: diaminophenyl-O-CH₂CH=CH-CH₂-N(CH₂CH=CH₂)(C₆H₄-C₈F₁₇)) |

TABLE 2-continued

Examples of aromatic diamines with reactive side-chains.

| Di-amine No. | Structure |
|---|---|
| 7 | (structure: 2,4-diaminophenyl-O-CH₂CH=CH-CH₂-N(CH₂CH=CH₂)(C₆H₄-C₈F₁₇)) |
| 8 | (structure: 2,4-diaminophenyl-N(Me)-CH₂CH=CH-CH₂-O-C₆H₄-C₈F₁₇) |
| 9 | (structure: C₆F₁₃-C₆H₄-N(CH₂CH=CH₂)-(2,4-diaminophenyl)) |

The following Examples are meant to exemplify the embodiments and are not meant to limit the scope of the invention.

EXAMPLE 1

The following example describes the synthesis of the novel aromatic diamine 1.

A mixture of 1H,1H-perfluorooctanol (30.0 g, 0.075 mol), 1,4-dibromo-2-butene (48.0 g, 0.25 mol), Aliquat 336 (1.5 g), toluene (150 mL) and potassium hydroxide (0.075 mol, 4.95 g) in water (50 mL) was heated to 80–90° C. for 3 hr. The mixture was extracted with water-ethyl ether. The extract was washed with water two times, washed with saturated sodium chloride solution, dried (MgSO₄) and concentrated to an oil. Excess dibromide was removed by recrystallization in hexane. The remaining oil was Kugelrohr distilled (0.1 mm Hg, 70–95° C.) to give 28.0 g of the 1-bromo-4-(1H,1H,-perfluorooctyloxy)-2-butene.

The 1-bromo-4-(1H,1H,-perfluorooctyloxy)-2-butene (28.0 g) was added to a mixture of 40 wt % methyl amine (59 mL), tetrahydrofuran (60 mL) and ethanol (40 mL) at 40° C. and the mixture stirred at ambient temperature for 2 hr. The mixture was basified with 20 wt % potassium hydroxide (KOH, 15 g), extracted, concentrated and distilled to give 18.0 g 1-(N-methylamino)-4-(1H,1H,-perfluorooctyloxy)-2-butene (0.1 mm Hg, 85–110° C.).

A mixture of 1-(N-methylamino)-4-(1H,1H,-perfluorooctyloxy)-2-butene (17.3 g) 3-fluoro-4-nitroaniline (5.46 g), triethylamine (7 mL) and NMP (80 mL) was heated 16 hr at 80–90° C. The mixture was extracted in the normal fashion and purified by chromatography to give 15.6 g of the 3-substituted nitroamine.

The nitroamine (15.2 g, 25 mmol) was treated with tin(II) chloride dihydrate (24.6 g, 0.11 mol), 10 N hydrochloric acid (20 mL) and ethanol (200 mL) for 16 hr at 40–45° C.

The mixture was diluted with cold water, basified with 20 wt % KOH (220 g), and extracted in the normal fashion. Purification by chromatography on silica gel and crystallization gave diamine 1 (mp 46–47° C.).

EXAMPLE 2

The following example describes the synthesis of the novel aromatic diamine 2.

A mixture of N-methyl-N'-methyl-1,4-diamino-2-butene (3.42 g, 30 mmol), 3-fluoro-4-nitroacetanilide (1.5 g, 15 mmol), and acetonitrile (10 mL) was heated to 70° C. for 3.5 hr. The mixture was extracted in the usual manner and concentrated to an oil. The oil (1.75 g, 6 mmol) was treated with 1-iodo-1H,1H,2H,2H-perfluorooctane (3.13 g, 6.6 mmol), NMP (10 mL), and potassium carbonate (1.24 g) at 60° C. for 16 hr. The mixture was extracted in the normal fashion and purified by chromatography to give 2.2 g of the corresponding acetanilide.

The acetanilide (2.2 g, 3.4 mmol) was heated to reflux with ethanol (42 mL) and 20 wt % sulfuric acid (18 mL) for 2 h. The mixture was basified with potassium hydroxide (36 g, 20 wt %), extracted in the normal fashion and purified by chromatography to give 1.6 g of the corresponding nitroamine as an oil.

The nitroamine (1.60 g, 2.7 mmol) was treated with tin(II) chloride dihydrate (3.0 g, 13.4 mmol), 10 N hydrochloric acid (1.6 mL) and ethanol (20 mL) for 2 hr at 40–45° C. The mixture was basified with 20 wt % KOH (26 g) and extracted in the normal fashion and purified by chromatography to give the diamine 2 (0.71 g, mp 42.5–44.5° C).

EXAMPLE 3

The following example describes the synthesis of the novel aromatic diamine 3.

A mixture of 2,4-dinitrophenol (5.18 g), 1-bromo-4-(1H, 1H,-perfluorooctyloxy)-2-butene (10.0 g), potassium carbonate (5.18 g) and NMP (50 mL) was heated to 50° C. for 24 hr. The mixture was extracted in the normal fashion except that the crude extract was first washed with dilute potassium hydroxide. The organic phase gave an oil (9.7 g).

The oil (9.7 g) was treated with tin(II) chloride dihydrate (27.5 g), 10 N hydrochloric acid (24.4 mL) and ethanol (140 mL) at 25–35° C. for 16 hr. The mixture was diluted with water, basified with 20 wt % KOH (245 g) and extracted in the normal fashion. Purification by chromatography gave diamine 3 (2.90 g, mp 48.5–50.8° C.).

EXAMPLE 4

The following example describes the synthesis of the novel aromatic diamine 4.

A mixture of (3-perfluoro-n-octyl)prop-2-enol (2.85 g, Oakwood Products) in pyridine (3 mL) was treated with tosyl chloride (2.85 g) in pyridine (6 mL) at 0–5° C. for 6 hr. The mixture was diluted with cold water, extracted with cold ethyl ether-tetrahydrofuran (4:1) two times and washed with cold 2 N hydrochloric acid. Further washing with water, brine and drying (Na$_2$SO$_4$) followed by concentration gave the corresponding tosylate as a solid (2.9 g).

The tosylate (3.9 g) was treated with 40 wt % methylamine (6.4 mL), ethanol (6 mL) and tetrahydrofuran (12 mL) for 4 hr at ambient temperature. Extraction with ether, washing with water and brine solution, drying over MgSO$_4$ and Kugelrohr distillation (80–100° C, 0.01 mm Hg) gave 2.7 g of N-methyl-(3-perfluoro-n-octyl)prop-2-enamine.

The above N-methyl-(3-perfluoro-n-octyl)prop-2-enamine (2.6 g) was treated with 3-fluoro-4-nitroaniline (0.62 g), triethylamine (1.2 mL) and NMP (6 mL) at 60–65° C. for 16 hr, and 80–90° C. for 23 hr. The mixture was extracted in the normal fashion and purified by chromatography to give the 3-substituted-4-nitroaniline as a yellow solid.

The above yellow solid (3.3 g) was treated with tin(II) chloride dihydrate (5.95 g), ethanol (40 mL) and 10 N hydrochloric acid (4.2 mL) at 35–40° C. for 18 hr. The mixture was diluted with water and basified with 20 wt % KOH (52 g), extracted in the normal fashion and purified by chromatography to give diamine 4 (1.1 g, mp 62–65° C.).

EXAMPLE 5

The following example describes the synthesis of the novel aromatic diamine 5.

The modified procedure of McLoughlin et al., Tetrahedron, 25, 5921 (1969), was used. Thus, a mixture of 3.17 g, copper bronze powder (Aldrich), perfluoro-1-iodooctane (13.5 g), and distilled dimethyl sulfoxide (40 mL) was heated to 110–120° C. for 3.0 hr followed by addition of 3-iodoaniline (4.92 g). The mixture was stirred at 100–110° C. for 16 hr. The mixture was cooled, diluted with water and ethyl ether and filtered through glass fiber. The filtrate was extracted with ethyl ether, the resulting oil Kugelrohr distilled (80–90° C., 0.1 mm Hg) and recrystallized from hexane to give 3-(perfluoro-n-octyl)benzenamine (5.7 g, mp 35.5–36° C. ).

A mixture of 3-(perfluoro-n-octyl)benzenamine (2.04 g), 2,4-dinitrofluorobenzene (0.78 g), NMP (8 mL) and triethylamine (0.85 mL) was heated to 70° C. for 16 hr. Extraction and recrystallization from hexane-ethyl acetate gave N-[3-(perfluorooctyl)phenyl]-2,4-dinitrobenzenamine (2.25 g, mp 124.5–125° C.).

A mixture of N-[3-(perfluorooctyl)phenyl]-2,4-dinitrobenzenamine (5.4 g), allyl bromide (1.5 mL), potassium carbonate (2.6 g) and N-methyl pyrrolidone (15 mL) was heated to 60–70° C. for 5.5 hr. Extraction in the normal fashion gave 5.6 g of N-allyl-N-[3-(perfluorooctyl)phenyl]-2,4-dinitrobenzenarnine.

A mixture of N-allyl-N-[3-(perfluorooctyl)phenyl]-2,4-dinitrobenzenamine (6.3 g), tin(II) chloride dihydrate (19.8 g), 10 N hydrochloric acid (11 mL) and ethanol (75 mL) was treated at 30–35° C. for 6.5 hr and overnight at room temperature. The mixture was diluted with water and basified with 20 wt % potassium hydroxide (180 g), and extracted in the normal fashion and purified by chromatography to give diamine 5 (2.65 g, mp 98–99.5° C.).

EXAMPLE 6

The following example describes the synthesis of the novel aromatic diamine 6.

A mixture of 3-perfluorooctylaniline (3.2 g), potassium carbonate (3.0 g), NMP (30 mL) and allyl bromide (0.67 mL) was heated to 70–80° C. for 3 hr. Extraction in the normal fashion gave N-allyl-3-perfluorooctylbenzenamine (1.7 g).

A mixture of 2,4-dinitrophenol (4.6 g, 80 wt %), potassium carbonate (4.2 g), NMP (40 mL) and 1,4-dibromo-2-butene (12.8 g) was heated to 45° C. for 2 hr. Extraction in the normal fashion and Kugelrohr distillation of the excess dibromide (0.1 mm Hg, 80° C.) gave 1-bromo-4-(2,4-dinitrophenyloxy)but-2-ene (3.7 g, mp 55–57° C.).

A mixture of N-allyl-3-perfluorooctylbenzenamine (1.7 g), 1-bromo-4-(2,4-dinitrophenyloxy)but-2-ene (1.08 g), NMP (20 mL) and potassium carbonate (1.5 g) was 5 heated to 80° C. for 16 hr. The mixture was extracted in the normal fashion and purified by chromatography to give N-[4-(2,4-dinitrophenyloxy)but-2-enyl]-N-allyl-3-perfluorooctylbenzenamine (0.75 g).

N-[4-(2,4-dinitrophenyloxy)but-2-enyl]-N-allyl-3-perfluorooctylbenzenamine is reduced with tin(I) chloride dihydrate in the usual manner to provide the diamine 6.

EXAMPLE 7

The following example describes the synthesis of the novel aromatic diamine 7.

A mixture of 2,5-dinitrophenol (4.0 g), potassium carbonate (4.6 g), NMP (40 mL) and 1,4-dibromo-2-butene (14.0 g) is heated to 45° C. for 2 hr. Extraction in the normal fashion and Kugelrohr distillation of the excess dibromide (0.1 mm Hg, 80° C.) gives 1-bromo-4-(2,5-dinitrophenyloxy)but-2-ene (mp 81–83° C.).

A mixture of N-allyl-3-perfluorooctylbenzenamine (1.7 g), 1-bromo-4-(2,5-dinitrophenyloxy)but-2-ene (1.08 g), NMP (mL) and potassium carbonate (1.5 g) is heated to 80° C. for 16 hr. The mixture is extracted in the normal fashion and purified by chromatography to give N-[4-(2,5-dinitrophenyloxy)but-2-enyl]-N-allyl-3-perfluorooctylbenzenamine.

N-[4-(2,5-dinitrophenyloxy)but-2-enyl]-N-allyl-3-perfluorooctylbenzenamine is reduced with tin(II) chloride dihydrate in the usual manner to provide the diamine 7.

EXAMPLE 8

The following example describes the synthesis of the novel aromatic diamine 8.

A mixture of 3.17 g, copper bronze powder (Aldrich), perfluoro-1-iodooctane (13.5 g), and distilled dimethyl sulfoxide (40 mL) is heated to 110–120° C. for 3.0 hr followed by addition 3-iodophenol (3.64 g). The mixture is stirred at 100–110° C. for 16 hr. The mixture is cooled, diluted with water and ethyl ether and filtered through glass fiber. The filtrate is extracted in the usual fashion, the resulting oil is treated with potassium hydroxide (2.0 g) in methanol (30 mL) for 1 hr at room temperature. The mixture is diluted with water, slightly acidified with 2 N hydrochloric acid and extracted in the normal fashion. The resulting material is Kugelrohr distilled and purified by recrystallization from hexane to give 3-(perfluoro-n-octyl)phenol.

A mixture of 3-(perfluoro-n-octyl)phenol (10.24 g), potassium carbonate (4.2 g), NMP (30 mL) and 1,4-dibromo-2-butene (12.8 g) is heated to 45° C. for 2 hr. Extraction in the normal fashion and Kugelrohr distillation of the excess dibromide (0.1 mm Hg, 80° C.) gives 1-bromo-4-[3-(perfluoro-n-octyl)phenoxy]but-2-ene.

A solution of (1-bromo-4-[3-(perfluoro-n-octyl)phenoxy]but-2-ene (12.9 g) in tetrahydrofuran (20 mL) is added to a solution of 40 wt % methyl amine (20 mL), ethanol (20 mL) and tetrahydrofuran (20 mL) at 40° C. The mixture is stirred at ambient temperature for 2 hr. and extracted in the normal fashion. The resulting oil is Kugelrohr distilled to give N-methyl-4-[3-(perfluoro-n-octyl)phenoxy]but-2-enamine.

A mixture of N-methyl-4-[3-(perfluoro-n-octyl)phenoxy]but-2-enamine (5.96 g), 3-fluoro-4-nitroaniline (1.56 g), triethylamine (2.0 mL) and NMP (15mL) at 80–90° C. for 23 hr. The mixture is extracted in the normal fashion and purified by chromatography to give the 3-substituted-4-nitroaniline.

The above 3-substituted-4-nitroaniline (7.31 g) is treated with tin(II) chloride dihydrate (9.0 g), ethanol (80 mL) and 10 N hydrochloric acid (8 mL) at 35–40° C. for 18 h. The mixture is diluted with water, basified with 20 wt % potassium hydroxide (80 g), extracted in the normal fashion and purified by chromatography to give diamine 8.

EXAMPLE 9

The following example describes the synthesis of the novel aromatic diamine 9.

A mixture of copper powder (3.18 g, 50 mmol), dimethyl sulfoxide (40 mL) and perfluoro-1-iodohexane (11.1 g, 25 mmol) was heated to 120° C. for 1.5 h. 4-Iodoaniline (5.48 g, 25 mmol) was added and the mixture stirred at 110–120° C. for a further 5 h. After quenching with water, filtration of solids, and extraction in the normal fashion, the material was purified by chromatography to give 4-perfluorohexylbenzenamine. (3.6 g).

A mixture of 4-perfluorohexylbenzenamine (3.6 g), tetrahydrofuran (40 mL), triethylamine (3.05 mL) and 2,4-dinitrofluorobenzene (1.63 g) was refluxed for 45 hr. The mixture was extracted in the normal fashion and the crude product recrystallized to give N-[4-(perfluorohexyl)phenyl]-2,4-dinitrobenzenamine (3.8 g, mp 145–146° C.).

A mixture of N-[4-(perfluorohexyl)phenyl]-2,4-dinitrobenzenamine (3.6 g, 6.2 mmol), NMP (40 mL), potassium carbonate (3.0 g) and allyl bromide (0.65 mL) was stirred at 75° C. for 4 hr. The mixture was extracted in the normal fashion, and the product recrystallized to give N-allyl-N-[4-(perfluorohexyl)phenyl]-2,4-dinitrobenzenamine (2.9 g).

A mixture of N-allyl- N-[4-(perfluorohexyl)phenyl]-2,4-dinitrobenzenamine (2.9 g), ethanol (40 mL),10 N hydrochloric acid (5.5 mL) and tin(II) chloride dihydrate (10.0 g) was heated to 35° C. for 16 hr. The mixture was diluted with water, basified with 20 wt % potassium hydroxide (90 g), extracted in the normal fashion and purified by chromatography to give diamine 9 (1.2 g oil).

EXAMPLE 10

A mixture of 3,3',4,4'-benzophenonetetracarboxylic dianhydride (3.69 g, 11.47 mmol), 1-(N,N-diallylamino)-2,4-benzenediamine (0.233 g, 1.15 mmol), diamine 1 (6.08 g, 10.32 mmol) and NMP (39.6 g) was stirred at 18° C. for 18 h under a nitrogen atmosphere. The polyamic acid solution was diluted to 10 wt % with γ-butyrolactone (45.1 g) and NMP (5.03 g). For spinning, the polyamic acid solution was further diluted to 5 wt % with 50/50 γ-butyrolactone/NMP solution.

Two 0.9 inch by 1.2 inch by 1 millimeter thick soda lime glass substrates with transparent indium-tin-oxide (ITO) coatings (DCI, Inc. Lenexa, KS 66219) were spin-coated and cured with the polyamic acid formulation to give optical alignment layers. Spin coating was achieved by filtering the prepolymer solution through a 0.45 micron Teflon filter membrane onto the surface of clean ITO substrates. The substrates were spun at 2500 RPM for 1 minute to produce uniform thin films. The resultant thin films were cured under nitrogen for 0.25 hr at 80° C. followed by 1 h at 180° C.

FIG. 1 is a schematic of the experimental set-up used to expose the substrates. The laser beam of about 1 cm diameter from laser 1, polarized along direction 2, entered a polarizing rotator and beam splitter combination 3 and, upon exiting, two polarization components 6 and 7 separated as they propagated away from 3. The wavelength range of the laser was 300–336 nm. By adjusting the polarizing rotator in 3, the ratio of optical power in 6 and 7 can be adjusted and, in this case, the ratio was adjusted to be 1:6. The total power in 6 and 7 was about 500 mW. Mirrors 5 reflected 6 and 7 through cylindrical lenses 8 and 9 with focal lengths of 5 cm and 10 cm, respectively. After passing through cylindrical lenses 8 and 9, 6 and 7 were focused into lines of about 1 cm X 0.2 cm onto the substrate(s) 10. The separation between the two parallel focused lines was about 1.5 mm. As depicted in FIG. 1, the substrates 10 were scanned perpendicular to the focused lines. Since the focused line lengths of about 1 cm was smaller than the desired exposure area, after scanning one time, the substrates were stepped 1.5 mm perpendicular to the scan direction (along the focused lines). The step and scan 11 were repeated until the entire substrate area was exposed. The scan speed for this exposure was 0.75 mm/s.

After exposure, the substrates were assembled with orthogonal orientation of the optically generated alignment direction. The cell thickness was about 4 microns. The cell was subsequently capillary filled with nematic liquid crystals suitable for active matrix liquid crystal displays. As expected, the liquid crystals were observed to align in a twisted nematic orientation when viewed between polarizers. Upon annealing the liquid crystal cell above the liquid crystal isotropic point (120° C. for 30 minutes), the uniformity of the alignment was observed to improve and was of good quality. The pretilt was measured with the PAS-301 Pretilt Analysis System (Elsicon, Inc, Wilmington, Del.) to be 19.6 degrees.

A further trial using a scan speed of 1.5 mm/sec resulted in similar alignment quality as the 0.75 mm/s scan speed after anneal. The pretilt was measured with the PAS-301 Pretilt Analysis System (Elsicon, Inc, Wilmington, Del.) to be 25.8 degrees.

In another trial 5 wt % polymer solution containing 52.6 wt % 2-butoxyethanol was printed on the substrates using a Nissho Printing Co. Angstromer SDR printer (Kenix Industries, Tempe, Ariz.). The printed substrates were exposed with system of FIG. 1 at a scan speed of 1.5 mm/s. After anneal, the alignment quality was similar to previous trials and the pretilt was 9.6 degrees.

EXAMPLE 11

A mixture of 3,3',4,4'-benzophenonetetracarboxylic dianhydride (128.9 mg, 0.4 mmol), 1-(N,N-diallylamino)-2,4-benzenediamine (8.1 mg, 0.04 mmol), diamine 2 (203.8 mg, 0.36 mmol) and NMP (1.36 g) was stirred at room temperature for 18 h under a nitrogen atmosphere. The polyamic acid solution was diluted to 5 wt % with γ-butyrolactone (3.23 g) and NMP (1.87 g).

Substrates were prepared, exposed at 0.75 mm/s and assembled as in Example 10. The alignment quality was good after anneal and the pretilt was 1.0 degrees.

EXAMPLE 12

A mixture of 3,3',4,4'-benzophenonetetracarboxylic dianhydride (161.1 mg, 0.50 mmol), N,N-diallyl-1,2,4-benzenetriamine (10.2 mg, 0.05 mmol), diamine 4 (267.8 mg, 0.45 mmol) and NMP (1.76 g) was stirred at room temperature for 18 h under a nitrogen atmosphere. The polyamic acid solution was diluted to 5 wt % with γ-butyrolactone (4.18 g) and NMP (2.42 g).

Substrates were prepared, exposed at 1.5 mm/s and assembled as in Example 10. The alignment quality was good after anneal and the pretilt was 21.7 degrees.

EXAMPLE 13

A mixture of 3,3',4,4'-benzophenonetetracarboxylic dianhydride (128.9 mg, 0.40 mmol), N,N-diallyl-1,2,4-benzenetriamine (8.1 mg, 0.04 mmol), diamine 5 (236.6 mg, 0.36 mmol) and NMP (1.48 g) was stirred at room temperature for 18 h under a nitrogen atmosphere. The polyamic acid solution was diluted to 3 wt % with γ-butyrolactone (3.52 g), NMP (2.04 g) and butyl cellusolve (5.04 g).

Substrates were prepared, exposed at 1.5 mm/s and assembled as in Example 10. The alignment quality was poor to fair after anneal and the pretilt was 3.5 degrees.

We claim:

1. Reactive aromatic diamines of the structure

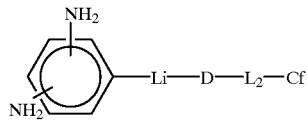

wherein $L_1$ and $L_2$ each, independently, is a covalent bond or a linking group selected from the group of —O—, —S—, —$NR_1$—, —O—CO—, —CO—O—, —$NR_1$—CO—, —CO—$NR_1$—, —$NR_1$—CO—O—, —O—CO—$NR_1$—, —$NR_1$—CO—$NR_1$—, and straight-chain and branched-chain alkylenes represented by —$(CH_2)_n$—, —$L_3$—$(CH_2)_n$—, —$(CH_2)_n$—$L_3$—, —$L_3$—$(CH_2)_n$—$L_4$—, each optionally mono- or poly-substituted by fluorine or chlorine and optionally chain interrupted by —O— or —$NR_1$, wherein $L_3$ and $L_4$ are selected from the group of —O—, —S—, —$NR_1$—, —O—CO—, —CO—O—, —$NR_1$—CO—, —CO—$NR_1$—, —$NR_1$—CO—O—, —O—CO—$NR_1$—, —$NR_1$—CO—$NR_1$—, $R_1$ is a hydrogen or lower alkyl group and n is 1 to 20;

D is a divalent group containing 1 to 4 carbon-carbon double bonds, selected from the group of $C_3$–$C_{24}$ aliphatic, $C_3$–$C_{24}$ alicyclic, $C_8$–$C_{24}$ arylalkyl groups, all optionally substituted with 1 to 4 heteroatoms selected from the group of oxygen, nitrogen and sulfur and optionally mono- or poly-substituted by fluorine, chlorine or cyano, wherein the carbon-carbon double bond(s) are isolated from any other Π-system within the side-chain;

$C_f$ represents a monovalent $C_4$ to $C_{20}$ fluorocarbon radical.

2. Reactive aromatic diamines of claim 1 wherein the diamines are selected from the group of 4-substituted-1,3-benzenediamines and 2-substituted-1,4-benzenediamines wherein the substituent is —$L_1$—D—$L_2$—$C_f$.

3. Reactive aromatic diamines of claim 2 wherein —D— is selected from the group of

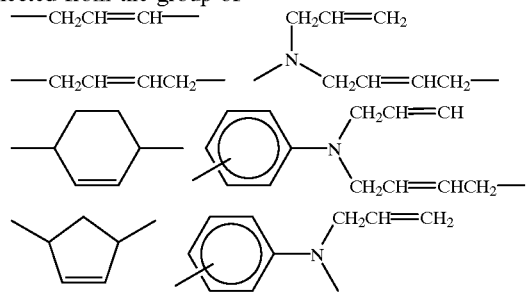

and $L_1$ and $L_2$ is selected from the group of covalent bond, —O—, and —$NR_1$—.

4. A reactive diamine of claim 3 of structure

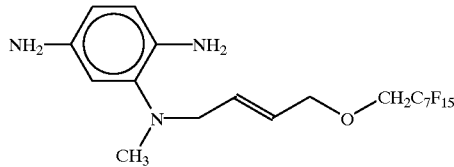

* * * * *